Jan. 14, 1930.  G. C. BEIDLER  1,743,310
PHOTOGRAPHIC COPY HOLDER
Filed Oct. 25, 1926  2 Sheets-Sheet 1
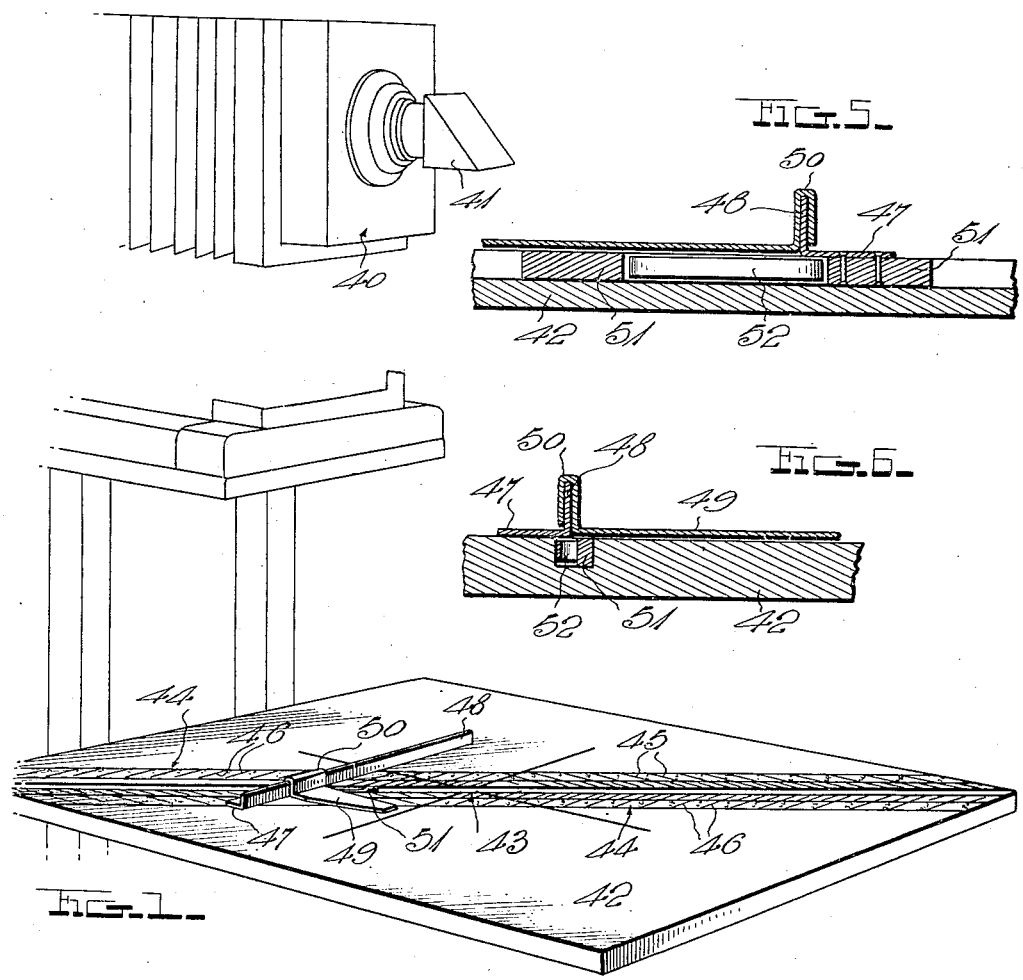
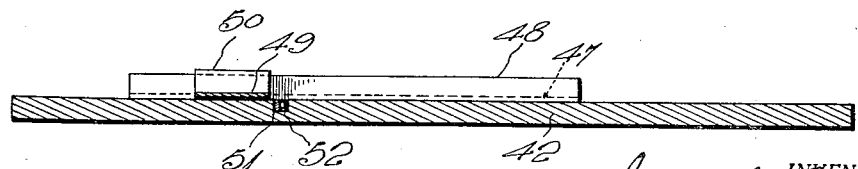
INVENTOR.
George C. Beidler,
BY Frank S. Appleman
ATTORNEYS.

Jan. 14, 1930.  G. C. BEIDLER  1,743,310
PHOTOGRAPHIC COPY HOLDER
Filed Oct. 25, 1926  2 Sheets-Sheet 2
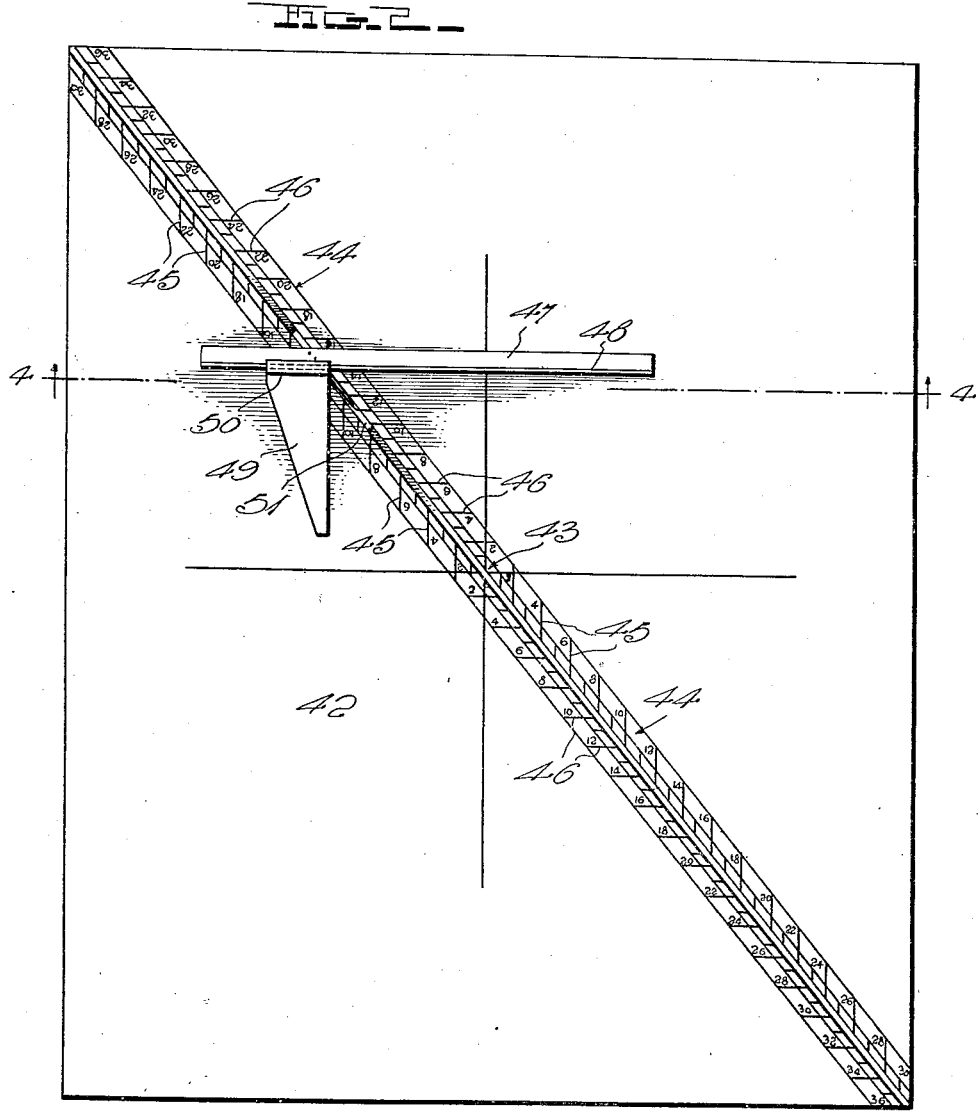
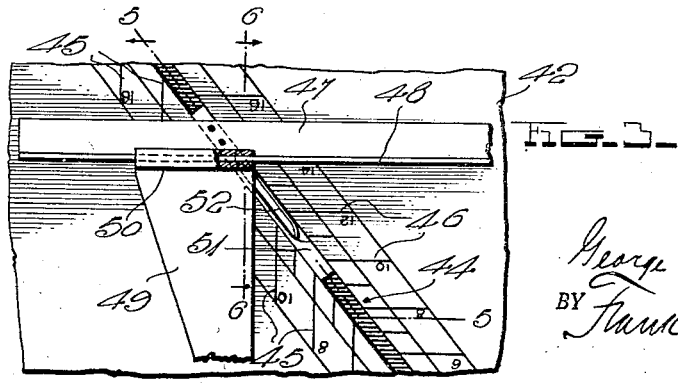
INVENTOR.
George C. Beidler,
BY
ATTORNEYS.

Patented Jan. 14, 1930

1,743,310

UNITED STATES PATENT OFFICE

GEORGE C. BEIDLER, OF ROCHESTER, NEW YORK

PHOTOGRAPHIC COPYHOLDER

Application filed October 25, 1926. Serial No. 144,038.

This invention relates to photographic copy holders, and has for an object the provision of means for indicating the area on a copy holder where a copy may be placed and properly positioned with respect to a lens to be used for photographing the copy; and it is furthermore an object of the invention to provide a guide against which the copy may be placed in order that an operator may know that his copy is properly positioned in the field of a lens.

It is a further object of this invention to provide novel means whereby copy of different dimensions may be placed on a copy holder in proper position with respect to the axis of a lens, and to supply guides for two edges of the copy, adjustable with relation to a scale having graduations and through which instrumentalities copies of different lengths and different widths may be located in the field of the lens.

More specifically, it is an object of this invention to produce a copy holder having a diagonally-arranged scale graduated in opposite directions, or in a direction from the center of the copy holder through which the scale is extended, and to provide the scale with graduated lines at angles to the length of the scale on opposite sides or edges of said scale.

It is furthermore an object of the invention to provide a straight edge or guide projecting across the scale and at right angles to two opposed edges of the copy holder and positioned at any one of the series of the graduations aforesaid.

It is also an object to provide a straight edge or guide which may be positioned at right angles to the first mentioned guide and in positions with relation to the other series of graduations at right angles to those with relation to which the first mentioned straight edge or guide coacts.

It is a still further object of this invention to produce novel means for mounting the straight edges in adjustable and operative relation to the copy holder and its scale and to each other, whereby the aforementioned results are attained.

With the foregoing and other objects in view, the invention consists in the details of construction, and in the arrangement and combination of parts to be hereinafter more fully set forth and claimed.

In describing the invention in details, reference will be had to the accompanying drawings forming part of this application wherein like characters denote corresponding parts in the several views, and in which—

Figure 1 illustrates a view in perspective of a copy holder embodying the invention in operative relation to a projecting means;

Figure 2 illustrates an enlarged plan view of the copy holder and parts associated with it;

Figure 3 illustrates an enlarged detail view of a fragment of the copy holder partly in section;

Figure 4 illustrates a sectional view on the line 4—4 of Fig. 2;

Figure 5 illustrates a sectional view on the line 5—5 of Fig. 3; and

Figure 6 illustrates a sectional view on the line 6—6 of Fig. 3.

In these drawings 40 denotes a conventional type of photographing apparatus whose prism 41 is located over a copy holder or board 42. The copy holder, in the present embodiment of the invention, is provided with a diagonally disposed scale graduated progressively from the central zone 43 toward the ends and the numerals employed for denoting the positions on the scale may be regarded as in inches.

It is seen that the scale has a well defined longitudinally extending central zone 44 and preferably the copy holder is slotted or recessed along said zone to provide a way or seat, for a purpose to be presently explained. The scale as here shown is further provided with graduations 45 extending crosswise thereto or in one direction with relation to opposed edges of the board, and other graduations 46 extending in an opposite direction crosswise of the board, or in a direction at right angles to the graduations 45, and these graduations in the present illustration are at angles of approximately 45 degrees to the length of the central zone 44. The graduations are numbered, as will be seen.

A straight edge or guide is formed, in the present embodiment of the invention, with a base 47, which is adapted to be moved with relation to or over the upper surface of the copy holding board, and it has an upstanding flange 48 at one edge which constitutes an abutment for the copy and a mounting for a straight edge or guide 49. The guide 49 has its end provided with a channeled flange 50 that embraces the flange 48 and hence the guide 49 may slide longitudinally of the guide on which it is mounted and it extends at right angles thereto, as fully shown in Figs. 2 and 3.

A rib 51 may be located on the under surface of the flange 47 and it may move in the seat or slot longitudinally of the scale in order that the guide may be located with respect to any of the so-called crosswise graduations and at a location whose number corresponds with the length in inches or other arbitrary unit of measurement of the copy to be placed on the board. When this adjustment has been attained, the guide 49 will be moved to a so-called crosswise graduation whose number indicates the width of the copy in inches. When these two simple and expeditiously accomplished adjustments have been attained, the copy may be located with its edges against the two guides, and if the center of the copy board has been properly located with respect to the axis of the lens or its field, the copy will be located in the field of the lens.

The rib 51 may have a bow spring 52 attached to it and this bow spring may bear against one wall of the slot in which the rib is slidable, and the guides will be frictionally held at different positions of adjustment and against accidental displacement while the copy is being manipulated.

I claim:

1. A copy holder for photographing purposes consisting of a copy support, a scale on or associated with the copy holding surface of the support, said scale having a diagonally extending central zone, graduations located at each edge of the said zone and disposed at angles of approximately forty-five degrees to said zone, the said copy support being slotted along the said zone, and right angularly disposed guides having means whereby they are movably mounted in said slots and with relation to each other.

2. A copy holder for photographing purposes consisting of a copy support, a scale on or associated with the copy holding surface of the support, said scale having a diagonally extending central zone, elongated graduations located at each edge of the said zone and disposed at angles of approximately forty-five degrees to said zone, guides, and means for movably mounting the guides in the central zone for movement with relation to each other and with relation to the line graduations.

3. A copy holder for photographing purposes consisting of a copy support, a scale on or associated with the copy holding surface of the support, said scale having a diagonally extending central zone, elongated graduations located at each edge of the said zone and disposed at angles of approximately forty-five degrees to said zone, and copy guides operative to engage edges of copy and mounted for movement at angles to each other and adjustable on the support with relation to said graduations.

4. A copy holder for photographing purposes consisting of a copy support, a scale associated with the copy holding surface of the support, said scale having two sets of graduations, one set denoting position for one edge of a copy and the other denoting position for the edge thereof at right angles to the first mentioned edge, copy guides having guiding edges at angles to each other, one of the said guides coacting with one set of graduations and the other of said guides coacting with the other of said graduations for determining the position of the copy.

5. A copy holder for photographing purposes consisting of a copy support, a scale associated with the copy holding surface of the support, said scale having two sets of graduations, one set denoting position for one edge of a copy and the other denoting position for the edge thereof at right angles to the first mentioned edge, copy guides having guiding edges at angles to each other, one of the said guides coacting with one set of graduations and the other of said guides coacting with the other of said graduations for determining the position of the copy, and means for mounting the guides one on the other for movement with relation to each other.

6. A copy holder for photographing purposes consisting of a copy support, a scale associated with the copy holding surface of the support, said scale having two sets of graduations, one set denoting position for one edge of a copy and the other denoting position for the edge thereof at right angles to the first mentioned edge, copy guides having guiding edges at angles to each other, one of the said guides coacting with one set of graduations and the other of said guides coacting with the other of said graduations for determining the position of the copy, and means for mounting the guides one on the other and on the copy holder.

7. A copy holder for photographing purposes consisting of a copy support, a scale associated with the copy holding surface of the support, said scale having two sets of graduations, one set denoting position for one edge of a copy and the other denoting position for the edge thereof at right angles to the first mentioned edge, guides whose guiding edges are at right angles to each other, one of the said guides coacting with one set of graduations and the other of said guides coacting with the other of said graduations for determining the position of the copy.

GEORGE C. BEIDLER.